United States Patent [19]

Bandyopadhyay

[11] Patent Number: 5,286,775

[45] Date of Patent: Feb. 15, 1994

[54] HALOGEN-FREE FLAME RETARDANT COMPOSITIONS

[75] Inventor: Pradip K. Bandyopadhyay, Austin, Tex.

[73] Assignee: Minnesota Mining and Manufacturing Company, St. Paul, Minn.

[21] Appl. No.: 997,074

[22] Filed: Dec. 29, 1992

[51] Int. Cl.$^5$ .............................. C08K 3/32; C08K 5/34
[52] U.S. Cl. ....................................... 524/416; 524/101
[58] Field of Search .............................. 524/416, 101

[56] References Cited

U.S. PATENT DOCUMENTS

| | | | |
|---|---|---|---|
| 3,810,862 | 5/1974 | Mathis et al. | 260/42.45 |
| 4,174,343 | 11/1979 | Hardy et al. | 260/45.75 |
| 4,187,214 | 2/1980 | Needham et al. | 524/416 |
| 4,223,071 | 9/1980 | Boyer et al. | 428/411 |
| 4,467,056 | 8/1984 | Staendeke et al. | 524/416 |
| 4,514,328 | 4/1985 | Staendeke et al. | 524/416 |
| 4,722,858 | 2/1988 | Harbourne et al. | 524/405 |
| 4,727,102 | 2/1988 | Scarso | 524/416 |
| 4,772,642 | 9/1988 | Staendeke | 524/416 |
| 4,857,673 | 8/1989 | Wilkus et al. | 524/94 |
| 4,871,795 | 10/1989 | Pawar | 524/267 |
| 4,997,876 | 3/1991 | Scarso | 524/416 |
| 5,071,901 | 12/1991 | Chakrabarti et al. | 524/366 |
| 5,116,891 | 5/1992 | Eberspach et al. | 524/100 |

FOREIGN PATENT DOCUMENTS

| | | | |
|---|---|---|---|
| 494778 | 7/1992 | European Pat. Off. | C01B 25/40 |
| 54-004946 | 1/1979 | Japan | C08K 3/32 |
| 54-007451 | 1/1979 | Japan | C08K 3/32 |
| 54-022450 | 2/1979 | Japan | C08K 3 |
| 62-011745 | 1/1987 | Japan | C08K 3/22 |
| 62-235343 | 10/1987 | Japan | C08K 3/22 |
| 1-108241 | 4/1989 | Japan | C08K 3 |
| 1-172440 | 7/1989 | Japan | C08L 23/08 |
| 2-284940 | 11/1990 | Japan | C08K 3/22 |

OTHER PUBLICATIONS

*Insulation Enhancement with Heat-Shrinkable Components*—J. W. Hoffman and others, IEEE Electrical Insulation Magazine, *Part I*, Mar./Apr. 1991 vol. 7, No. 2, p. 33; *Part II*, May/Jun. 1991 vol. 7, No. 3, p. 16; *Part III*, Jul./Aug. 1991 vol. 7, No. 4. p. 31.

*Primary Examiner*—Kriellion S. Morgan
*Attorney, Agent, or Firm*—Gary L. Griswold; Walter N. Kirn; Darla P. Neaveill

[57] ABSTRACT

A halogen-free composition comprising 100 parts of polyolefin resin grafted with from about 1 to about 10 parts maleic anhydride; from about 0.1 part to about 10 parts of a free radical catalyst therefor, from about 0.5 part to about 10 parts of an antioxidant, and from about 5 parts to about 500 parts of at least one ammonium polyphosphate containing flame retardant.

15 Claims, No Drawings

HALOGEN-FREE FLAME RETARDANT COMPOSITIONS

BACKGROUND OF THE INVENTION

1. Field of the Invention

The invention relates to heat shrinkable, filled polymer compositions containing halogen-free flame retardant components suitable for use in electrical applications.

2. Description of the Related Art

Heat-shrinkable components, e.g., extruded or molded products, have been widely used in electrical applications. In a series of publications, Hoffman et al, disclose a range of uses in electrical insulation and environmental protection, from low voltage to high voltage installations. *Insulation Enhancement with Heat-Shrinkable Components*—J. W. Hoffman and others, IEEE Electrical Insulation Magazine, Part I, March/April 1991 Vol. 7, No.2, page 33; Part II, May/June 1991 Vol. 7, No.3, page 16; Part III, July/August 1991 Vol. 7, No.4, page 31.

Among the various requirements for satisfactory performance, these authors frequently emphasize the need for superior electrical insulation and prevention of moisture attack. The latter is accomplished either by the use of hydrophobic sealant materials or by the intentional incorporation of hydrophobic species in the heat-shrinkable compositions.

Another requirement specified for heat-shrinkable polymers is the requirement that they be semi-crystalline polymers. The most common class of semicrystalline polymers includes polyolefins. Therefore polyolefins have tended to be materials of choice for the manufacture of heat-shrink products. Polyolefin polymers containing additives such as flame retardants have been extensively disclosed in the prior art. See, for example, U.S. Pat. No. 4,174,343; JP 54,022,450; JP 54,007,451; JP 54,004,946; U.S. Pat. No. 3,810,862; EP 494,778; U.S. Pat. No. 5,116,891; U.S. Pat. No. 4,997,876; U.S. Pat. No. 4,871,795; U.S. Pat. No. 4,727,102 and U.S. Pat. No. 4,772,642. Flame retardants disclosed include such inorganic additives as magnesium hydroxide, calcium hydroxide, aluminum hydroxide, alkali phosphates and ammonium polyphosphate. Flame retardancy of these materials may be augmented using organic compounds including those containing halogen compounds. Other references disclose modified polyolefins. Modification is usually accomplished by the grafting of a selected functionality at intervals along the backbone of the polyolefin polymer. Suitable polymers in this category are generally acid modified polyolefins produced by reaction with, e.g., an unsaturated carboxylic acid or derivative thereof.

Japanese patent JP 1,108,241 discloses polyolefins grafted with a variety of acid species, including maleic acid, maleic anhydride, fumaric acid, acrylic acid etc. Flame retardant compositions, based on these modified polymers, are disclosed. The preferred additives used to impart flame retardancy include aluminum hydroxide, magnesium hydroxide, magnesium carbonate, calcium hydroxide, and the like. JP 2,284,940 discloses that the bending strength of a polyolefin modified with acrylic acid or maleic anhydride was approximately three times greater than the unmodified polymer. Flame retardant was added to the acid-modified polyolefin, the use of ammonium polyphosphate was not disclosed. Further, there was no teaching or suggestion that higher amounts of additives of this type could be accommodated.

Other references cite similar compositions, including JP 1,172440; JP 62,235,343; JP 62,011,745; U.S. Pat. No. 4,722,858. However, none of the modified polyolefin references disclose the use of ammonium polyphosphate containing compositions. There is no suggestion of the use of ammonium polyphosphate in compositions and structures used to provide electrical insulation and environmental protection, especially moisture protection.

The reason for the rejection of ammonium polyphosphate in electrically insulating or moisture repellant compositions is due to the fact that ammonium polyphosphate readily absorbs water. Thus it inherently attracts moisture which interferes with the effectiveness of electrical insulation and contact integrity at the site of an electrical connection. One reference, U.S. Pat. No. 4,772,642, attempts to solve the problem by encapsulating ammonium polyphosphate in a water-insoluble synthetic resin to produce a more water-stable fire-retardant composition. However, this is expensive to accomplish.

Similarly, U.S. Pat. No. 5,071,901 discloses the use of quaternary ammonium salts for modifying the surface of ammonium polyphosphate. This patent states that electrical insulation containing ammonium polyphosphate is generally deficient in water resistance. Therefore a surface treatment is needed to prevent leaching of ammonium polyphosphate from polymeric insulating materials, such as polyolefins, to which it may be added. It is stated that if leaching occurs, the electrical insulation and fire retardant performance will suffer.

The use of ammonium polyphosphate in heat shrinkable structures including tubes and molded shapes has been disclosed in U.S. Pat. No. 4,223,071. This patent discloses the use of ammonium polyphosphate as one of a series of phosphorus containing compounds used for erosion control of insulators for high voltage lines. No reference is made to its use in high performance insulation of electrical wiring or as a flame retardant.

The present inventor has discovered a combination of materials which will allow the use of ammonium polyphosphate in halogen-free flame retardant containing polymer compositions suitable for use where electrical insulation is of primary importance. In addition, the compositions of this invention can accommodate significantly higher quantities of flame retardant than that previously disclosed. The present invention provides compositions which take advantage of the superior flame retardancy of ammonium polyphosphate, while significantly reducing its tendency to attract water or water vapor. This is accomplished without any special surface treatment of the ammonium polyphosphate particles. Compositions of the current invention are therefore effective in preventing the common phenomenon of water leaching of ammonium polyphosphate from the polymer matrix. Additionally it has been discovered that flame retardancy is further enhanced by the incorporation of higher levels of flame retardant than was previously thought possible. This is accomplished without loss of mechanical performance of the polymer compositions.

These compositions are especially useful for flame retardant tape backings, such as those utilized in the electrical industry.

These compositions are also useful for flame retardant heat-shrink extruded or molded products for the electrical industry.

SUMMARY OF THE INVENTION

The present invention provides halogen-free polyolefin compositions containing flame retardant additives. These polyolefin compositions are useful for tape backings and extruded or molded heat-shrink components for use in electrical applications. Compositions of the invention use graft-modified polyolefin polymers and copolymers derived from polyolefins. The resulting graft polymers are then combined with additives in compositions which have improved mechanical properties and high flame retardancy.

Surprisingly, use of the acid-modified polyolefin and the hydrophilic flame retardant appears to have a synergistic effect, such that the ammonium polyphosphate appears to be rendered inaccessible to water. Thus, it does not cause the expected deterioration of electrical properties associated with compositions of the prior art. This makes it possible to provide heat-shrinkable tapes and molded or extruded shapes using compositions comprising acid-modified polyolefin polymers or modified ethylene copolymers, an antioxidant and a combination of flame retardant materials.

Specifically, halogen-free compositions of the invention comprise 100 parts of polyolefin resin grafted with from about 1 to about 10 parts maleic anhydride; from about 0.1 part to about 10 parts of a free radical catalyst therefor, from about 0.5 part to about 10 parts of an antioxidant, and from about 5 parts to about 500 parts of at least one ammonium polyphosphate containing flame retardant.

One embodiment of the invention comprises a halogen-free heat-shrink article comprising 100 parts of polyolefin resin grafted with from about 1 to about 10 parts, from about 0.1 part to about 5 parts organic peroxide catalyst, from about 0.5 parts to about 10 parts of an antioxidant, and from about 5 parts to about 500 parts of an ammonium polyphosphate containing flame retardant.

Preferred compositions of the invention are halogen-free electrical tape backings comprising 100 parts of polyolefin resin grafted with from about 1 to about 10 parts, from about 0.1 part to about 5 parts organic peroxide catalyst, from about 0.5 parts maleic anhydride to about 10 parts of an antioxidant, and from about 5 parts to about 500 parts of an ammonium polyphosphate containing flame retardant.

All compositions within the scope of the invention successfully passed UL-94, V-0 flame test using a specimen thickness of 0.08 cm to 0.16 cm.

As used herein, the term "original polyolefin polymer" refers to the polyolefin polymer prior to the graft conversion reaction, or the addition of any ingredients for such reaction.

DETAILED DESCRIPTION OF THE INVENTION

In the selection of polymers to be used in electrical applications, there are at least three conditions which must be met. The first requirement is the need for high insulation resistance. Second, is the need for low dielectric constant. Third, prevention of attraction of the composition for moisture and other negative species, which facilitate formation of ionic charge carriers. For electrical applications, the most useful combination of properties is found in polymers of the polyolefin family. Commonly used polymers include,
polyethylene (LDPE, LLDPE, and the like);
poly(ethylene-ethyl-acrylate);
poly(ethylene-vinyl-acetate);
poly(ethylene-methyl-acrylate);
chlorinated polyethylene
and blends thereof.

Preferred polymers include linear low density polyethylene, (LLDPE), available as "Dowlex-2047A" from Dow Chemical Co., and ethylene-vinyl-acetate, available as Elvax TM 460 or Elvax TM 470 from DuPont. Graft polymers of these homopolymers or copolymers are prepared using maleic anhydride in the presence of a suitable free-radical initiator.

Compositions of the invention are grafted with from about 1 to about 10 parts of maleic anhydride, preferably from about 2 to about 7 parts.

Useful free-radical initiators include those which are normally suitable for free-radical polymerization of polyolefins such as organic peroxides, e.g., lauryl peroxide, dicumyl peroxide, benzoyl peroxide, and thermal initiators e.g., 2,2'-azobisbutyronitrile, commercially available from DuPont under the trade name Vazo TM 64. The initiator comprises from about 0.1 to about 10 parts per hundred parts original polyolefin polymer, preferably from about 1 to about 5 parts.

Compositions of the invention also comprise an antioxidant. The antioxidant is useful in amounts of from about 0.5 parts to about 10 parts per hundred parts original polyolefin resin. Useful antioxidants include 2,5 ditertiary amyl hydroquinone, tertiary butyl hydroxytoluene, and thio-bis(t-butyl m-cresol), available as Santonox-R TM from Monsanto.

Compositions of the invention further comprise a flame retardant additive. Useful flame retardants include inorganic oxides, hydroxides and phosphates, as well as those containing ammonium polyphosphate, e.g. Exolit TM IFR-10, Exolit TM IFR-23 and Exolit TM IFR-422, all of which are available from Hoechst-Celanese. An organic co-reagent is usually added in combination with the inorganic materials. It is important to note that the flame retardant additives are not subjected to any special treatment to reduce sensitivity to moisture or water solubility. An additional non ammonium polyphosphate containing flame retardant may also be present.

Surprisingly large amounts of flame-retardant may be added to acid modified polyolefins without detrimental effect upon the physical properties of the polymer. Physical property improvement of grafted polyolefins over standard polyolefins has been observed previously. However, it is surprising that such improvement would allow the inclusion of greater amounts of flame retardant materials without losing said improved characteristics. Ammonium polyphosphate containing flame retardant additives comprise from about 5 parts to about 500 parts per 100 parts original polyolefin resin, preferably from about 25 parts to about 250 parts, most preferably from about 60 parts to about 125 parts.

Compositions of the invention may further comprise additional adjuvants. Classes of additives typically employed include, inert fillers, couplers, plasticizers, UV stabilizers, antioxidants, curing agents and other useful additives, in minor amounts which do not change the essential nature of the composition.

Compositions of the current invention utilize the minimum number of required components while providing highly effective electrically insulating, flame retarding materials.

The polyolefin compositions of the invention are useful for tape backings and extruded or molded heat-shrink components for use in electrical applications. The flame retardant properties are retained in the resulting tape backings, and in extruded and molded heat-shrink products made therefrom.

For example, a tape backing of the invention may be coated with an adhesive, and used for electrical insulating tape. Extruded and molded heat-shrink products are useful as protective electrically insulating covers, in an electrical cable splicing operation. Since the compositions include polyolefins, which are semi-crystalline polymers, conventional processing techniques may be used to form the heat-shrinkable products such as tapes and shapes.

The following examples provide compositions which demonstrate outstanding electrical insulation and flame retardancy performance while incorporating quantities of additives previously viewed as detrimental to performance characteristics.

Quantities of materials are expressed in terms of parts per hundred (pph) based upon the original 100 parts of polyolefin resin prior to reaction with grafting components. Therefore, all compositions are presented with components defined in parts per hundred of the original resin.

EXAMPLES

Glossary of Materials

APP Ammonium Polyphosphate
Dowlex TM -2047A Linear Low Density Polyethylene
Elvax TM 460 Ethylene Vinyl Acetate
Elvax TM Ethylene Vinyl Acetate
DPD - 6169 Ethylene Ethyl Acrylate
Exolit TM IFR-10 Intumescent Flame Retardant (66% APP)
Exolit TM IFR-23 Intumescent Flame Retardant (80% APP)
Exolit TM IFR-422 Intumescent Flame Retardant (100% APP)
Santonox TM R Thia-bis(t-butyl m-cresol)
Maleic Anhydride 99% Maleic Anhydride
Dicup TM 40KE Dicumyl Peroxide (40% in $CaCO_3$)
Dicup TM R Dicumyl Peroxide (99%)

EXAMPLES 1 AND 2

The following information describes a general preparation for compositions useful in the invention. Examples 1 and 2 differ in the level of maleic anhydride grafts present in the modified polyolefin polymers.

|  | Example 1 | Example 2 |
|---|---|---|
| Polymer | 100 parts | 100 parts |
| Maleic Anhydride | 2.0 | 4.0 |
| Dicup TM 40KE | 1.0 | 2.0 |
| Santonox TM R | 3.8 | 3.8 |
| Exolit TM IFR-23 | 130.5 | 134.2 |

Part A—Maleic Anhydride Grafting

The grafting reaction and mixing with flame retardant were conducted in sequence on a Haake Rheomix TM with a constant mixing speed of 50 rpm. Polymer was fluxed at 135° C. (2750° F.) for one minute and then maleic anhydride and dicumyl peroxide were simultaneously added. The mixing process was continued for two minutes and then Santonox R TM was added. Santonox R TM has two purposes. It is first used to quench the free radical grafting reaction, after which any excess acts as a protective antioxidant for the composition.

Part B—Addition of Flame Retardant

The temperature of the grafted polymer was raised to 199° C. (390° F.). At this temperature the polymer is molten and the flame retardant may be readily mixed into the composition. Thereafter, mixing of the composition was continued for three to four minutes to ensure satisfactory distribution of the flame retardant.

Sample Preparation

The compositions were molded into plaques 15.2 cm square and 0.078 cm thick at a molding temperature of 163° C. (325° F.). The mechanical properties of these samples were tested according to ASTM D638. Table 1 shows typical results using Elvax TM 470 as the polymer matrix. Table 2 shows the results of using different polymer matrices.

COMPARATIVE EXAMPLE 3

Using the same equipment and conditions outlined in Examples 1 and 2, flame retardant Exolit TM IFR-23 was added to polymers which were not subjected to maleic anhydride grafting. The results for this comparative composition are also presented in Table 1.

TABLE 1

| Ex No | Exolit TM IFR-23 pph | Tensile Strength MPa | Elongation at Break % |
|---|---|---|---|
| 1 | 130.5 | 11.90 | 605 |
| 2 | 134.2 | 14.42 | 610 |
| 3A | 126.8 | 9.75 | 530 |

EXAMPLES 4–8 AND 4C–8C

Examples 4–8 were made as described in Example 1, with each composition have 2 pph grafting, and Comparative Examples 4C–8C were made as described in Example 3C with no grafting. Various polyolefin resins were used.

TABLE 2

| Ex No | Polyolefin Resin | Exolit TM IFR pph | Tensile Strength MPa | Elongation at Break % |
|---|---|---|---|---|
| 4 | Elvax TM 460 | 130.5 | 8.03 | 545 |
| 4C | Elvax TM 460 | 126.8 | 5.77 | 410 |
| 5 | Elvax TM 470 | 130.5 | 11.90 | 605 |
| 5C | Elvax TM 470 | 126.8 | 9.75 | 530 |
| 6 | Dowlex TM 2047A | 130.5 | 10.72 | 420 |
| 6C | Dowlex TM 2047A | 126.8 | 6.43 | 130 |
| 7 | DPD-6169 | 130.5 | 9.25 | 650 |
| 7C | DPD-6169 | 126.8 | 7.35 | 585 |
| 8 | Blend* | 130.5 | 11.30 | 570 |
| 8C | Blend* | 126.8 | 9.75 | 510 |

*Blend 50/50 = 50 parts Elvax TM 470 + 50 parts grafted Elvax TM 470.

EXAMPLES 9–17

Grafted polyolefin polymers comprising 100 pph Elvax TM 470, 3.5 pph maleic anhydride, 3.0 pph Dicup-40 KE and 4.2 pph Santonox R were prepared according to Example 1, part A. Increasing amounts of Exolit TM IFR - 23, containing ammonium polyphosphate, were added to the grafted polymer as described in Example 1, part B.

Physical properties of these compositions are provided in Table 3. There is clear evidence that the properties of compositions containing grafted polyolefin polymers consistently exceed those where n on-grafted polymers are used. In Examples 9-17, 100 parts of Elvax TM 470 were used. Table 3 shows the physical properties and the changes in those properties as the Exolit TM IFR-23 amount is varied.

TABLE 3

| Ex No | Exolit TM IFR-23 pph | Polymer Type | Tensile Strength MPa | Elongation at Break % |
|---|---|---|---|---|
| 9 | 5.8 | Control | 24.30 | 800 |
|   |   | Grafted | 24.99 | 825 |
| 10 | 12.3 | Control | 22.41 | 760 |
|   |   | Grafted | 23.96 | 810 |
| 11 | 27.6 | Control | 18.96 | 700 |
|   |   | Grafted | 21.20 | 760 |
| 12 | 47.4 | Control | 15.69 | 650 |
|   |   | Grafted | 18.62 | 720 |
| 13 | 78.3 | Control | 13.10 | 600 |
|   |   | Grafted | 15.86 | 670 |
| 14 | 110.7 | Control | 10.69 | 550 |
|   |   | Grafted | 13.27 | 630 |
| 15 | 166.1 | Control | 8.27 | 425 |
|   |   | Grafted | 10.68 | 465 |
| 16 | 258.3 | Control | 6.21 | 300 |
|   |   | Grafted | 7.93 | 345 |
| 17 | 442.8 | Control | 3.96 | 160 |
|   |   | Grafted | 5.17 | 200 |

Water Immersion Tests

The insulation resistance was measured for a heat shrink material composition according to the Example 9 (50% Exolit TM IFR-23). Measurements (ASTM D-257) were made initially and after samples had been immersed in water, maintained at 23° C., for increasing periods of time. Results of the water immersion test are shown in Table 4.

TABLE 4

| | Insulation Resistance (Ohm-cm) | |
|---|---|---|
| Water Immersion (days) | Control (no grafting) | Grafted Elvax TM |
| 0 | $5.4 \times 10^9$ | $1.0 \times 10^{14}$ |
| 1 | $4.2 \times 10^5$ | $3.8 \times 10^{12}$ |
| 3 | $4.8 \times 10^4$ | $3.0 \times 10^{11}$ |
| 7 | Below $10^3$ | $2.8 \times 10^{10}$ |

A second water immersion test was performed to determine the amount of water which formulations, containing various levels of maleic anhydride grafts, absorb when submerged in water, at room temperature, for a period of twenty-four hours.

EXAMPLES 18-21

Table 5 shows varied compositions of the invention; table 6 shows the amount of water absorbed for various amounts of graft-modified polyolefin resin. Water absorption is reported in Table 6 as function of weight gained during immersion. Reduction in water uptake is clearly affected by the amount of maleic anhydride (see Examples 13-16) incorporated into the polyolefin by grafting. In Examples 18-21, there were 100 parts of Elvax TM 470, with the following additives.

TABLE 5

| Ex No | Maleic Anhydride pph | Dicup TM 40KE pph | Santonox TM R pph | Exolit TM IFR-23 pph |
|---|---|---|---|---|
| 18 | 0 | 0.86 | 1.19 | 102 |
| 19 | 3.5 | 3.01 | 4.17 | 110.7 |
| 20 | 4.8 | 4.13 | 5.71 | 114.6 |
| 21 | 6.0 | 5.16 | 7.14 | 118.3 |

TABLE 6

| Ex No | Amount of Grafting pph | Water Absorption Wt % |
|---|---|---|
| 18 | 0 | 11.9 |
| 19 | 3.5 | 5.7 |
| 20 | 4.8 | 3.9 |
| 21 | 6.0 | 2.9 |

EXAMPLES 21-25

The dielectric constant of various electrically insulating compositions was measured for compositions containing polyolefin polymers with and without grafting. The compositions varied according to the amounts of flame-retardant (Exolit TM IFR-23) added. In Examples 21-25, there were 100 parts of Elvax TM 470 with the following additives.

Table 7 shows the formulations of compositions of the invention in which the amount of flame retardant is varied; Table 8 shows the dielectric constant for each of the compositions.

TABLE 7

| Ex No | Maleic Anhydride pph | Dicup TM 40-KE pph | Santonox TM R pph | Exolit TM IFR-23 pph |
|---|---|---|---|---|
| 21 | 3.5 | 3.0 | 4.2 | 38.4 |
| 22 | 3.5 | 3.0 | 4.2 | 47.4 |
| 23 | 3.5 | 3.0 | 4.2 | 78.3 |
| 24 | 3.5 | 3.0 | 4.2 | 90.6 |
| 25 | 3.5 | 3.0 | 4.2 | 110.7 |

TABLE 8

| Ex No | Exolit TM IFR-23 pph | Elvax TM 470 Control | Grafted Elvax TM 470 (3.5 pph M.A.) |
|---|---|---|---|
| 21 | 38.4 | 3.05 | 2.85 |
| 22 | 47.4 | 3.2 | 3.0 |
| 23 | 78.3 | 3.7 | 3.35 |
| 24 | 90.6 | 4.1 | 3.5 |
| 25 | 110.7 | 5.1 | 3.65 |

EXAMPLE 26

A flame retardant composition was prepared according to Example 14, wherein the ammonium polyphosphate was replaced by magnesium hydroxide. The mechanical properties are shown in Table 9 and the water immersion testing results are shown in Table 10.

TABLE 9

| | Control | Grafted |
|---|---|---|
| Tensile Str. (MPa) | 9.13 | 12.34 |
| Elongn. at Break (%) | 150 | 202 |
| Water Absorption (Wt. %) | 0.43 | 1.77 |

TABLE 10

| Water Immersion (days) | Insulation Resistance (Ohm-cm) | |
| --- | --- | --- |
| | Control | Grafted |
| 0 (Dried) | $5.0 \times 10^{15}$ | $4.4 \times 10^{15}$ |
| 1 | $4.2 \times 10^{13}$ | $5.1 \times 10^{12}$ |
| 3 | $1.2 \times 10^{12}$ | $6.9 \times 10^{10}$ |
| 7 | $3.3 \times 10^{11}$ | $2.4 \times 10^{10}$ |

EXAMPLE 27

A composition having the formulation 100 parts of Elvax TM 470, 5.0 parts of maleic anhydride, 1.7 parts Dicup TM -R, and 5.9 parts Santonox TM R was used to prepare a grafted polymer using reactive extrusion techniques. The components were combined in a twin screw extruder operating at 120° C. Residence time at this temperature was 33 seconds. Polymer from the reactive extrusion process was transferred to a Banbury mixer operating at 199° C.

To 100 parts of the grafted polymer was then added 100 parts of Exolit TM IFR-2300, 4.6 parts trimethylolpropane triacrylate, 3.0 parts Irganox TM 1010, and 1.0 part Irganox TM 1024.

The resultant composition was charged into an extruder to produce tubing with an internal diameter of 0.317 cm and a wall thickness of 0.0635 cm. This tubing was subjected to electron beam irradiation of 8.0 Megarads. Thereafter it was heated and expanded to dimensions which were twice those of the unexpanded tubing.

The resulting tube displays heat-shrink properties when heated to a suitable temperature. Measurement of physical, electrical and flame retardant properties confirmed that this tubing is extremely effective in protecting and electrically insulating spliced connections. Its effectiveness for flame retardancy is shown by its capacity to withstand the rigorous UL-224, VW-1 flammability test. At the high particulate loading of approximately 50%, the composition used for heat shrink tubing exhibited tensile strength of 14.71 MPa and elongation at break of 710%. other tests associated with UL-224, such as insulation resistance and heat aging, were easily passed by the heat shrink tubing described here.

What is claimed is:

1. A halogen free composition useful for electrical insulation comprising 100 parts of polyolefin resin grafted with from about 1 to about 10 parts maleic anhydride; from about 0.1 part to about 10 parts of a free radical catalyst therefore, from about 0.5 to about 10 parts of an antioxidant and from about 5 parts to about 500 parts of at least one ammonium polyphosphate containing flame retardant.

2. A halogen-free composition according to claim 1 comprising from about 2 to about 7 parts maleic anhydride.

3. A halogen-free electrical tape backing comprising 100 parts of polyolefin resin grafted with from about 1 to about 10, from about 0.1 part to about 5 parts organic peroxide catalyst, from about 0.5 parts to about 10 parts of an antioxidant, and from about 5 parts to about 500 parts of an ammonium polyphosphate containing flame retardant.

4. A halogen-free electrical tape backing according to claim 3 wherein polymer is selected from the group consisting of polyethylene, polypropylene, ethylene vinyl acetate, ethylene ethyl acrylate, ethylene methyl acrylate, ethylene-polypropylene, propylene rubber and mixtures thereof.

5. A halogen-free electrical tape backing according to claim 1 wherein said ammonium polyphosphate containing flame retardant comprises from about 25 parts to about 250 parts.

6. A halogen-free electrical tape backing according to claim 5 wherein said ammonium polyphosphate containing flame retardant comprises from about 60 parts to about 125 parts.

7. A halogen-free electrical tape backing according to claim 1 wherein said antioxidant is selected from the group containing active functional groups such as phenols, amines, quinoline, imidazole, phosphite, thiol and cyanurate.

8. A halogen-free electrical tape backing according to claim 1 comprising from about 1 to about 5 parts of said free radical initiator.

9. A halogen-free heat-shrink article useful as electrically insulating covers comprising 100 parts of polyolefin resin grafted with from about 1 to about 10 parts maleic anhydride, from about 0.4 part to about 5 parts organic peroxide catalyst, and from about 5 parts to about 500 parts of an ammonium polyphosphate containing flame retardant.

10. A halogen-free heat-shrink article according to claim 9 wherein polymer is selected from the group consisting of polyethylene, polypropylene, ethylene vinyl acetate, ethylene ethyl acrylate, ethylene methyl acrylate, ethylene-polypropylene, propylene rubber and mixtures thereof.

11. A halogen-free heat-shrink article according to claim 9 wherein said ammonium polyphosphate containing flame retardant comprises from about 25 parts to about 250 parts.

12. A halogen-free heat-shrink article according to claim 11 wherein said ammonium polyphosphate containing flame retardant comprises from about 60 parts to about 125 parts.

13. A halogen-free heat-shrink article according to claim 9 wherein said antioxidant is selected from the group containing active functional groups such as phenols, amines, quinoline, imidazole, phosphite, thiol and cyanurate.

14. A halogen-free heat-shrink article according to claim 9 comprising from about 1 to about 5 parts of said free radical initiator.

15. A halogen-free heat-shrink article according to claim 9 wherein said article was formed by a process selected from extrusion and molding.

* * * * *

UNITED STATES PATENT AND TRADEMARK OFFICE
CERTIFICATE OF CORRECTION

PATENT NO.      :   5,286,775

DATED           :   February 15, 1994

INVENTOR(S)     :   Pradip K. Bandyopadhyay

It is certified that error appears in the above-identified patent and that said Letters Patent is hereby corrected as shown below:

Column 3, Line 38, after the first occurrence of "parts," insert --maleic anhydride--.

Column 3, Line 46, after the first occurrence of "parts," insert --maleic anhydride--.

Column 3, Line 47, delete the words "maleic anhydride".

Column 5, Line 35, after "Elvax™" insert --470--.

Column 5, Line 66, "(2750° F)" should read --(275° F)--.

Column 7, Line 6, "n on-grafted" should read --non-grafted--.

Signed and Sealed this

Eighteenth Day of October, 1994

Attest:

BRUCE LEHMAN

Attesting Officer

Commissioner of Patents and Trademarks